(12) United States Patent
Halaczkiewicz et al.

(10) Patent No.: US 8,794,677 B2
(45) Date of Patent: Aug. 5, 2014

(54) INTERCHANGEABLE FITTING SYSTEM AND METHOD

(75) Inventors: Thomas D. Halaczkiewicz, San Luis Obispo, CA (US); David K. Porter, San Luis Obispo, CA (US); William R. Ehrgott, Arroyo Grande, CA (US)

(73) Assignee: Crystal Engineering Corporation, San Luis Obispo, CA (US)

( * ) Notice: Subject to any disclaimer, the term of this patent is extended or adjusted under 35 U.S.C. 154(b) by 1176 days.

(21) Appl. No.: 12/249,869

(22) Filed: Oct. 10, 2008

(65) Prior Publication Data

US 2010/0090456 A1    Apr. 15, 2010

(51) Int. Cl.
*F16L 19/02*    (2006.01)

(52) U.S. Cl.
USPC ............. 285/354; 285/14; 285/330; 285/355; 285/386; 285/924

(58) Field of Classification Search
USPC ......... 285/330, 333, 354–355, 386–387, 390, 285/332.2, 924
See application file for complete search history.

(56) References Cited

U.S. PATENT DOCUMENTS

| | | | | |
|---|---|---|---|---|
| 685,851 | A * | 11/1901 | Kifer et al. | 285/311 |
| 1,095,220 | A * | 5/1914 | McIntosh | 285/88 |
| 1,460,769 | A * | 7/1923 | Saunders | 285/333 |
| 2,087,185 | A * | 7/1937 | Dillon | 285/111 |
| 2,110,127 | A * | 3/1938 | Hinderliter | 285/108 |
| 2,111,627 | A * | 3/1938 | Hinderliter | 285/349 |
| 2,251,715 | A * | 8/1941 | Parker | 285/114 |
| 2,500,276 | A * | 3/1950 | Church | 285/2 |
| 2,685,461 | A * | 8/1954 | Mueller | 285/332.2 |
| 2,712,458 | A * | 7/1955 | Lipson | 285/101 |
| 3,148,901 | A | 9/1964 | Campbell | |
| 3,151,893 | A | 10/1964 | Lyon | |
| 3,266,824 | A | 8/1966 | Nealy | |
| 3,275,348 | A | 9/1966 | Scott | |
| 3,362,731 | A | 1/1968 | Gasche et al. | |
| 3,395,934 | A | 8/1968 | Rosan et al. | |
| 3,584,900 | A | 6/1971 | Lennon et al. | |
| 4,422,675 | A * | 12/1983 | Norris et al. | 285/45 |
| 4,553,776 | A | 11/1985 | Dodd | |
| 4,776,618 | A | 10/1988 | Barree | |
| 5,110,160 | A | 5/1992 | Brozovic | |
| 5,263,312 | A * | 11/1993 | Walker et al. | 60/797 |
| 5,423,581 | A | 6/1995 | Salyers | |
| 5,533,764 | A | 7/1996 | Williamson | |
| 5,788,292 | A | 8/1998 | Korner et al. | |
| 6,045,166 | A | 4/2000 | Krause | |
| 7,309,084 | B2 | 12/2007 | Cooke, Jr. | |
| 7,419,189 | B2 | 9/2008 | Dickerson et al. | |

\* cited by examiner

*Primary Examiner* — Aaron Dunwoody
*Assistant Examiner* — Fannie Kee
(74) *Attorney, Agent, or Firm* — Fitch, Even, Tabin & Flannery LLP

(57) ABSTRACT

An interchangeable fitting system generally involving a fitting, the fitting including a male connector and a female connector, the male and female connectors each having a forward portion and an aft portion, the male connector having a primary sealing structure and a secondary sealing structure, the female connector having a primary sealing structure and a secondary sealing structure, and the male primary sealing structure being interfaceable with the female primary sealing structure, and the male secondary sealing structure being interfaceable with the female secondary sealing structure.

25 Claims, 2 Drawing Sheets

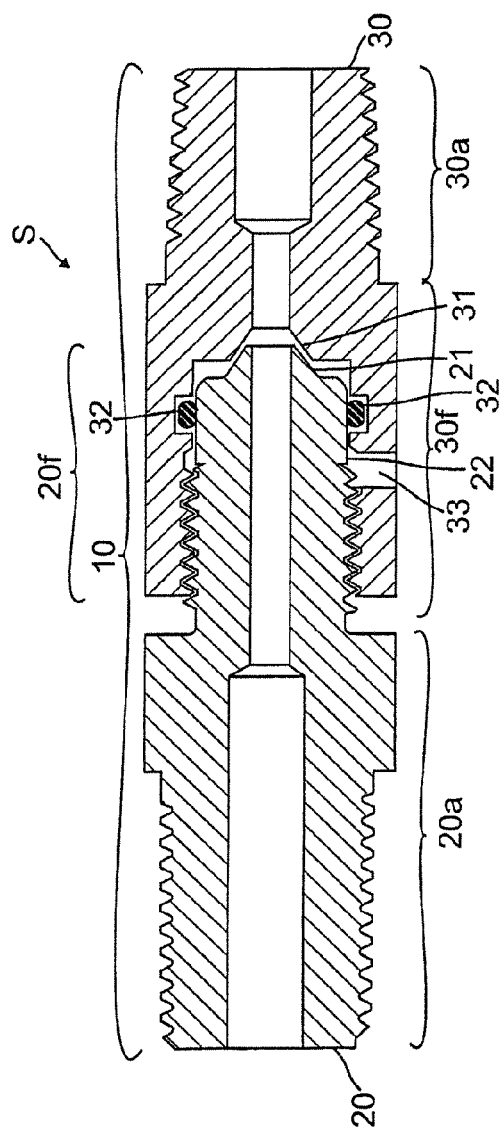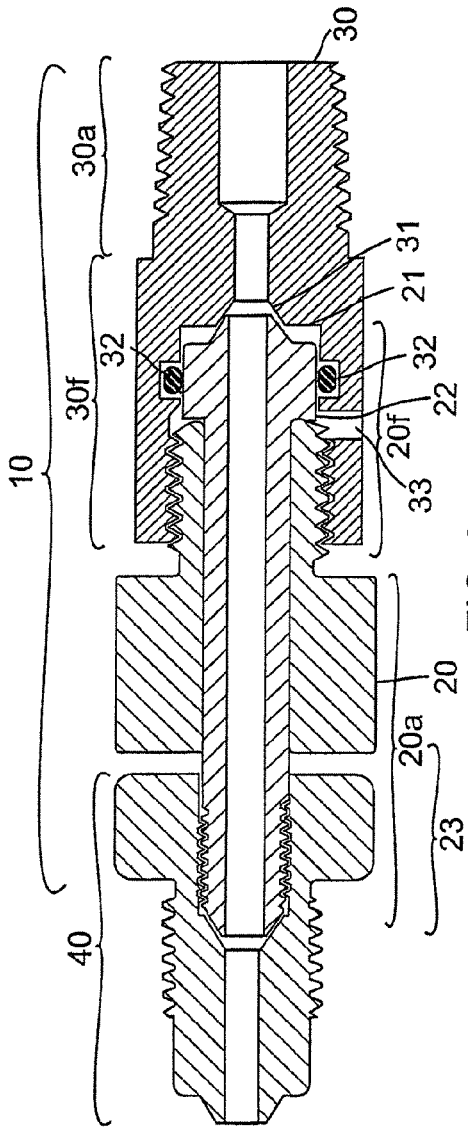

INTERCHANGEABLE FITTING SYSTEM AND METHOD

TECHNICAL FIELD

Figure 3:
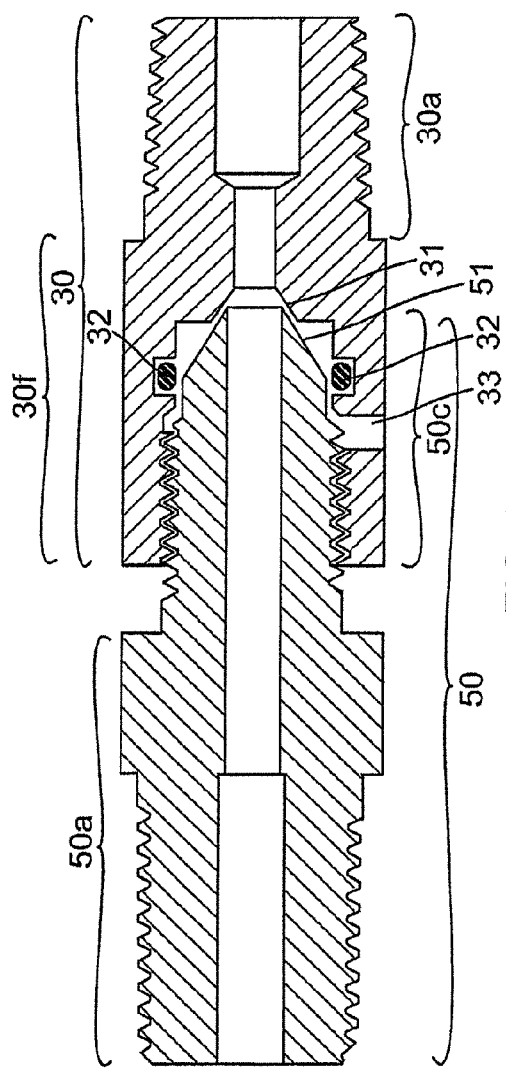

The present invention technically relates to fittings. More specifically, the present invention technically relates to high pressure fittings. Even more specifically, the present invention technically relates to high pressure fittings that are hand-tightenable and are operable under extended vacuum conditions as well.

BACKGROUND ART

Many high pressure fittings and fitting systems have been developed in the related art. However, these related art devices and systems do not offer flexibility via interchangeability, a sufficient hand-tightening option at high pressures, or operation under a vacuum condition. One related art high pressure hydraulic fitting uses a first O-ring disposed in a channel and a locking nut that is engaged to a body. The locking nut has an internal threaded section that is arranged to mate with the threaded section on the body. Another related art apparatus involves a small-diameter tubing connector and sealing apparatus for anchoring a tubing end. This apparatus has four separate sealing areas and uses packing rings.

Another related art device involves a fitting for a conduit having a frusto-conical forwardly converging sealing surface and a frusto-conical camming mouth and uses front and back ferrules on a conduit. Upon application of a substantially axial compressive force to the ferrules, they become deformed into gripping engagement with the conduit. Yet another related art apparatus involves a low-carryover fitting assembly for coupling tubing to a device having a sealing surface, using ferrules, a sleeve having a ramped inner surface, and a coupling nut.

Other related art devices include a hydraulic coupling which forms contact seals to fluidly connect a tapered port with a tube having a threaded connecting portion. The body of the port includes a lip which deforms on the inner tapered surface of the fitting. The lipped port may also be provided by a collar disposed between the port and the fitting. Optionally, O-rings may be added to provide additional seals. However, this coupling seals only with the application of tool generated torques. The foregoing related art devices are readily interchangeable, are not hand-tightenable at high pressures, and do not perform well under vacuum conditions or extended vacuum conditions.

Typically, a problem in the related art is that a worker "out in the field" on a high-pressure line would need to bring a ½-inch tube, inconveniently cut threads into the tube, screw a collet onto the freshly cut threads, and then install the part without any further sealing mechanism, whereby a fluid under high-pressure would leak.

Thus, a long-felt need exists in the art for an interchangeable fitting system comprising a fitting having a male portion that is interfaceable with a plurality of non-system female connectors and the female portion that is interfaceable with a plurality of non-system male connectors, wherein the fitting is hand-tightenable in a high pressure range, wherein the fitting is wrench-tightenable in yet a higher pressure range, and wherein the fitting is operable under a vacuum condition as well.

SUMMARY OF TIE INVENTION

The present invention solves the foregoing problems in the related art in an interchangeable fitting system, as well as corresponding methods of fabrication and use. The present invention interchangeable fitting system generally comprises a fitting, the fitting including a male connector and a female connector, the male and female connectors each having a forward portion and an aft portion, the male connector being interfaceable with a plurality of non-system female connectors, and the female connector being interfaceable with a plurality of non-system male connectors, the male connector having a primary sealing structure and a secondary sealing structure, the female connector having a primary sealing structure and a secondary sealing structure, and the male primary sealing structure being interfaceable with the female primary sealing structure, and the male secondary sealing structure being interfaceable with the female secondary sealing structure.

The present invention method of fabricating an interchangeable fitting system generally comprises providing a fitting, the fitting providing step including providing a male connector and providing a female connector, the male connector and female connector providing step each comprising providing a respective forward portion and a respective aft portion, the male connector providing step comprising providing interfaceablity of the male connector with a plurality of non-system female connectors, and the female connector providing step comprising providing interfaceablity of the female connector with a plurality of non-system male connectors, the male connector providing step comprising providing the male connector with a primary sealing structure and a secondary sealing structure, the female connector providing step comprising providing the female connector with a primary sealing structure and a secondary sealing structure, and whereby the male primary sealing structure is interfaceable with the female primary sealing structure, and the male secondary sealing structure is interfaceable with the female secondary sealing structure.

The present invention method of using an interchangeable fitting system comprises providing an interchangeable fitting system, the system comprising a fitting, the fitting including a male connector and a female connector, the male and female connectors each having a forward portion and an aft portion, the male connector being interfaceable with a plurality of non-system female connectors, and the female connector being interfaceable with a plurality of non-system male connectors, the male connector having a primary sealing structure and a secondary sealing structure, the female connector having a primary sealing structure and a secondary sealing structure, and the male primary sealing structure being interfaceable with the female primary sealing structure, and the male secondary sealing structure being interfaceable with the female secondary sealing structure; and connecting the fitting to at least one element selected from a group consisting essentially of a hydraulic system, a pneumatic system, a flexible hose, a pipe, and a rigid tube, wherein the connecting step comprises a step selected from a group consisting essentially of hand-tightening the fitting in a pressure range of approximately 5,000 psi to approximately 10,000 psi and wrench-tightening the fitting in a pressure range of up to approximately 150,000 psi.

Advantages of the present invention include, but are not limited to, providing flexibility via mating system components that are interchangeable with a plurality of non-system components using the aft portions of the system components, such as mating with different thread standards and different sealing configurations, e.g., accommodation of both tapered and parallel threads, conic sealing faces, flat sealing faces, face seals, etc., providing quick and temporary connections in the field, providing the capability of tapping into high pressure lines for making measurements through a test port, facilitating calibration over a broad temperature range using the present high-pressure quick-connect fitting system, and increasing safety in a high pressure or vacuum environment almost two-fold by allowing hand-tightening at relatively high pressure without risk of personal injury. Other features of the present invention are disclosed, or are apparent, in the section entitled "Mode(s) for Carrying-Out the Invention," disclosed, infra.

BRIEF DESCRIPTION OF THE DRAWING(S)

For a better understanding of the present invention, reference is made to the below-referenced accompanying Drawing(s). Reference numbers refer to the same or equivalent parts of the present invention throughout the several figures of the Drawing(s).

FIG. 1 is a cross-sectional view of an interchangeable fitting system, comprising a fitting, the fitting comprising male and female connectors (system), the male connector and the female connector having complementary parallel threads at their respective forward portions in combination with tapered threads at their respective aft portions, wherein both a primary seal and a secondary seal are achieved, in accordance with an embodiment of the present invention.

FIG. 2 is a cross-sectional view of an interchangeable fitting system, comprising a fitting, the fitting comprising male (swivel) and female connectors, the male and female connectors having complementary parallel threads at their respective forward portions, wherein the female connector comprises a tapered thread at its aft portion, wherein the male connector comprises an adapter portion, having a parallel thread, at its aft portion for coupling with a non-system female connector, and wherein both a primary seal and a secondary seal are achieved, in accordance with another embodiment of the present invention.

FIG. 3 is a cross-sectional view of a non-system male connector and the female connector (system) as having complementary parallel threads at their respective forward portions, wherein the female connector comprises a tapered thread at its aft portion, wherein the non-system male connector comprises a tapered thread at its aft portion, wherein a hard interface is formed between the respective conical surfaces, and wherein a primary seal is formed, in accordance with a further embodiment of the present invention.

Figure 4:
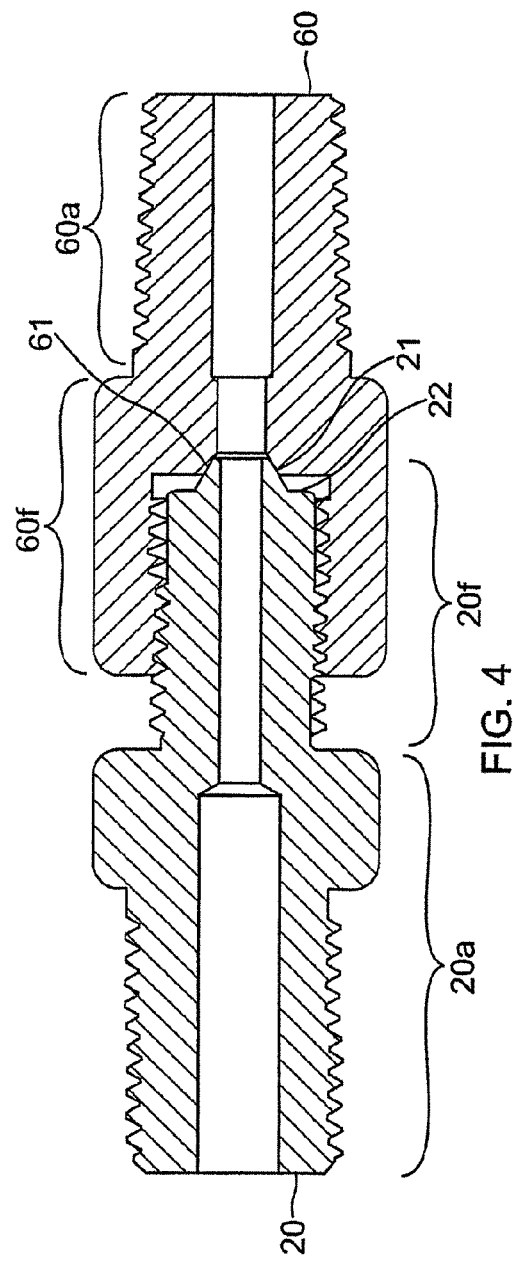

FIG. 4 is a cross-sectional view of a system male connector and a non-system female connector as having complementary parallel threads at their respective forward portions, wherein the non-system female connector comprises a tapered thread at its aft portion, wherein the system male connector comprises a tapered thread at its aft portion, wherein a hard interface is formed between the respective conical surface, and wherein a primary seal is formed, in accordance with yet a further embodiment of the present invention.

MODE(S) FOR CARRING-OUT THE INVENTION

Referring to FIG. 1, an interchangeable fitting system S is illustrated which generally comprises a fitting 10, in accordance with the present invention. The fitting 10 includes a male connector 20 and a female connector 30, the male and female connectors 20, 30 each having a forward portion 20f, 30f and an aft portion 20a, 30a, the male connector 20 being interfaceable with a plurality of non-system female connectors (not shown), and the female connector 30 being interfaceable with a plurality of non-system male connectors (not shown), the male connector 20 having a primary sealing structure 21 and a secondary sealing structure 22, the female connector 30 having a primary sealing structure 31 and a secondary sealing structure 32 and the male primary sealing structure 21 being interfaceable with the female primary sealing structure 31, and the male secondary sealing structure 22 being interfaceable with the female secondary sealing structure 32. The female connector 30 further comprises a weep hole 33 disposed forward of the female secondary sealing structure 32 for facilitating indication of a condition, such as an over-pressurized state and a leaking state.

Still referring to FIG. 1, the male primary sealing structure 21 comprises a frusto-conical sealing surface; and the female primary sealing structure 31 comprises a complementary frusto-conical sealing face, wherein the frusto-conical sealing surface and the complementary frusto-conical sealing face are interactable as a hard interface. The frusto-conical sealing surface comprises an angle of approximately 59°; and the complementary frusto-conical sealing face comprises an angle of approximately 60°. The male secondary sealing structure 22 comprises an integrally formed collar portion disposed aft of the male primary sealing structure 21. The integrally formed collar portion comprises a cross-section, such as a circular cross-section and a conical cross-section. The female secondary sealing structure 32 comprises an element, such as an O-ring, a gasket, a washer, a seal, and a radial seal, being seated forward of the female primary sealing structure 31.

Referring to FIGS. 1-3, the male connector forward portion 20f comprises a parallel thread; and the male connector aft portion 20a comprises a threading feature, such as a parallel thread, a tapered thread, a pipe thread, a male national pipe thread, a British standard parallel thread, a JIC 37-degree thread, an SAE 37-degree thread, a Type "M" 58-degree thread, a metric swivel fitting thread, a high-pressure hose thread, an industry-available connection system thread, a high-pressure tubing thread, and any other suitable threading system. The female connector forward portion 30f comprises a parallel thread; and the female connector aft portion 30a comprises a threading feature, such as a parallel thread, a tapered thread, a pipe thread, a male national pipe thread, a British standard parallel thread, a JIC 37-degree thread, an SAE 37-degree thread, a Type "M" 58-degree thread, a metric swivel fitting thread, a high-pressure hose thread, an industry-available connection system thread, a high-pressure tubing thread, and any other suitable threading system. By example only, the male connector 20 and the female connector 30 are shown in FIG. 1 as having complementary parallel threads at their respective forward portions 20f, 30f in combination with tapered threads at their respective aft portions 20a, 30a. In this example, both a primary seal and a secondary seal are achieved.

Still referring to FIG. 1-3, the fitting 10 is hand-tightenable in a pressure range of approximately 5,000 psi to approximately 10,000 psi. For even higher pressures, the fitting 10 is wrench-tightenable in a pressure range of up to approximately 150,000 psi. Further, the fitting 10 is operable under an extended vacuum condition. The fitting system S is used for connecting an element, such as a hydraulic system, a pneumatic system, a flexible hose, a pipe, and a rigid tube ( not shown). The system S may optionally further comprise a hose (not shown) being coupled with the fitting 10, wherein the hose comprises a material, such as stainless steel, copper, polyamide, polyurethane, copper, rubber, brass, polyoxymethylene, nylon, and any other suitable material. The fitting 10 comprises a material, such as stainless steel, 316 stainless steel, titanium, nickel, iron, chromium, cobalt, copper, molybdenum, brass, steel, Monel®, Hastelloy®, and any other suitable material.

Referring to FIG. 2, by example only, the male connector 20 and the female connector 30 are shown as having complementary parallel threads at their respective forward portions 20f, 30f, wherein the female connector 30 comprises a tapered thread at its aft portion 30a, and wherein the male connector 20 comprises an adapter portion 23, having a parallel thread, at its aft portion 20a for coupling with a non-system female connector 40, in accordance with another embodiment of the present invention. In this example, both a primary seal and a secondary seal are achieved.

Referring to FIG. 3, by example only, a non-system male connector 50 and the female connector 30 are shown as having complementary parallel threads at their respective forward portions 50f, 30f, wherein the female connector 30 comprises a tapered thread at its aft portion 30a, and wherein the non-system male connector 50 comprises a tapered thread at its aft portion 50a, wherein a hard interface is formed between the respective conical surfaces, and wherein a primary seal is formed, in accordance with a further embodiment of the present invention.

Referring to FIG. 4, by example only, a system male connector 20 and a non-system female connector 60 as having complementary parallel threads at their respective forward portions 20f, 60f, wherein the non-system female connector 60 comprises a tapered thread at its aft portion 60a wherein the system male connector 20 comprises a tapered thread at its aft portion 20a, wherein a hard interface is formed between the respective conical surfaces 21a, 61, and wherein a primary seal is formed, in accordance with yet a further embodiment of the present invention.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, that various changes and modifications in form, material, and fabrication material detail may be made, without departing from the spirit and scope of the inventions as set forth in the appended claims, should be readily apparent to those of ordinary skill in the art. No claim herein is to be construed under the provisions of 35 U.S.C. §112, sixth paragraph, unless the element is expressly recited using the phrase "means for."

INDUSTRIAL APPLICABILITY

The present invention industrially applies to fittings. More specifically, the present invention industrially applies to high pressure fittings. Even more specifically, the present invention industrially applies to high pressure fittings that are hand-tightenable and are operable under extended vacuum conditions as well.

What is claimed:

1. An interchangeable fitting system, comprising:
a fitting, the fitting including a male connector and a female connector, the male and female connectors each being monolithic and having a forward portion and an aft portion, the forward portion of the male connector being at least in part received in the forward portion of the female connector and having threads engaged to threads of the forward portion of the female connector,
the forward portion of the male connector having a male primary sealing structure including a frusto-conical sealing surface and a male secondary sealing structure including a cylindrical collar portion disposed aft of the male primary sealing structure, the forward portion of the female connector having a female primary sealing structure including a frusto-conical sealing surface complementary to the frusto-conical sealing surface of the male primary sealing structure and a female secondary sealing structure including a sealing element disposed forward of the female primary sealing structure, and
the frusto-conical sealing surface of the male primary sealing structure being interfaceable with the frusto-conical sealing surface of the female primary sealing structure, and the collar portion of the male secondary sealing structure being interfaceable with the sealing element of the female secondary sealing structure.

2. A system, as recited in claim 1,
wherein the sealing element is selected from a group consisting essentially of an O-ring, a gasket, a washer, a seal, and a radial seal.

3. A system, as recited in claim 1,
wherein the frusto-conical sealing surface of the male primary sealing structure comprises an angle of approximately 59°, and
wherein the complementary frusto-conical sealing face of the female primary sealing structure comprises an angle of approximately 60°.

4. A system, as recited in claim 1, wherein the fitting is hand-tightenable in a pressure range of approximately 5,000 psi to approximately 10,000 psi.

5. A system, as recited in claim 1, wherein the fitting is wrench-tightenable in a pressure range of up to approximately 150,000 psi.

6. A system, as recited in claim 1, wherein the fitting is operable under an extended vacuum condition.

7. A system, as recited in claim 1, wherein the fitting system is used for connecting at least one element selected from a group consisting essentially of a hydraulic system, a pneumatic system, a flexible hose, a pipe, and a rigid tube.

8. A system, as recited in claim 1,
wherein the male connector aft portion comprises threads selected from a group consisting essentially of a parallel thread, a tapered thread, a pipe thread, a male national pipe thread, a British standard parallel thread, a JIC 37-degree thread, an SAE 37-degree thread, a Type "M" 58-degree thread, a metric swivel fitting thread, a high-pressure hose thread, an industry-available connection system thread, and a high-pressure tubing thread.

9. A system, as recited in claim 1,
wherein the female connector aft portion comprises threads selected from a group consisting essentially of a parallel thread, a tapered thread, a pipe thread, a male national pipe thread, a British standard parallel thread, a JIC 37-degree thread, an SAE 37-degree thread, a Type "M" 58-degree thread, a metric swivel fitting thread, a high-pressure hose thread, an industry-available connection system thread, and a high-pressure tubing thread.

10. A system, as recited in claim 1, wherein the fitting comprises at least one material selected from a group consisting essentially of stainless steel, 316 stainless steel, titanium, nickel, iron, chromium, cobalt, copper, molybdenum, brass, steel, Monel®, Hastelloy®, and any other suitable material.

11. A system, as recited in claim 1, wherein the female connector further comprises a weep hole disposed forward of the female secondary sealing structure for facilitating indication of at least one condition selected from a group consisting essentially of an over-pressurized state and a leaking state.

12. A system, as recited in claim 1,
wherein the sealing element is selected from a group consisting essentially of an O-ring, a gasket, a washer, a seal, and a radial seal,
wherein the frusto-conical sealing surface of the male primary sealing structure comprises an angle of approximately 59°,
wherein the complementary frusto-conical sealing face of the female primary sealing structure comprises an angle of approximately 60°,
wherein the fitting is hand-tightenable in a pressure range of approximately 5,000 psi to approximately 10,000 psi,
wherein the fitting is wrench-tightenable in a pressure range of up to approximately 150,000 psi,
wherein the fitting is operable under an extended vacuum condition,
wherein the fitting system is used for connecting at least one element selected from a group consisting essentially of a hydraulic system, a pneumatic system, a flexible hose, a pipe, and a rigid tube,
wherein the male connector aft portion comprises threads selected from a group consisting essentially of a parallel thread, a tapered thread, a pipe thread, a male national pipe thread, a British standard parallel thread, a JIC 37-degree thread, an SAE 37-degree thread, a Type "M" 58-degree thread, a metric swivel fitting thread, and a high-pressure hose thread, an industry-available connection system thread, a high-pressure tubing thread,
wherein the female connector aft portion comprises threads selected from a group consisting essentially of a parallel thread, a tapered thread, a pipe thread, a male national pipe thread, a British standard parallel thread, a JIC 37-degree thread, an SAE 37-degree thread, a Type "M" 58-degree thread, a metric swivel fitting thread, a high-pressure hose thread, an industry-available connection system thread, and a high-pressure tubing thread, and
wherein the female connector further comprises a weep hole disposed forward of the female secondary sealing structure for facilitating indication of at least one condition selected from a group consisting essentially of an over-pressurized state and a leaking state.

13. A system, as recited in claim 1, wherein the male connector includes a shoulder portion between the male primary sealing structure and the male secondary sealing structure, and wherein the female connector includes a shoulder portion between the female primary sealing structure and the female secondary sealing structure.

14. A male connector apparatus, comprising:
a male connector having a monolithic structure including a forward portion and an aft portion,
the forward portion and the aft portion of the male connector each including threads,
the male connector having a male primary sealing structure including a frusto-conical sealing surface and a male secondary sealing structure including a collar portion disposed aft of the male primary sealing structure,
the male primary sealing structure being interfaceable with a female primary sealing structure including a frusto-conical sealing surface complementary to the frusto-conical sealing surface of the male primary sealing structure, and
the male secondary sealing structure being interfaceable with a female secondary sealing structure including a sealing element disposed forward of the female primary sealing structure.

15. An apparatus, as recited in claim 14, wherein the frusto-conical sealing surface of the male primary sealing structure comprises an angle of approximately 59°.

16. An apparatus, as recited in claim 14, wherein the male connector is used for connecting at least one element selected from a group consisting essentially of a hydraulic system, a pneumatic system, a flexible hose, a pipe, and a rigid tube.

17. An apparatus, as recited in claim 14,
wherein the threads of the male connector aft portion are selected from a group consisting essentially of a parallel thread, a tapered thread, a pipe thread, a male national pipe thread, a British standard parallel thread, a JIC 37-degree thread, an SAE 37-degree thread, a Type "M" 58-degree thread, a metric swivel fitting thread, a high-pressure hose thread, an industry-available connection system thread, and a high-pressure tubing thread.

18. An apparatus, as recited in claim 14, wherein the male connector includes a shoulder portion between the male primary sealing structure and the male secondary sealing structure.

19. A female connector apparatus, comprising:
a female connector having a monolithic structure with a forward portion and an aft portion,
the forward portion of the female connector having threads, a female primary sealing structure including a frusto-conical sealing surface and a female secondary sealing structure including a sealing element disposed forward of the female primary sealing structure, and
the female primary sealing structure being interfaceable with a male primary sealing structure including a frusto-conical sealing surface complementary to the frusto-conical sealing surface of the female primary sealing structure, and
the female secondary sealing structure being interfaceable with a male secondary sealing structure including a collar portion disposed aft of the male primary sealing structure.

20. An apparatus, as recited in claim 19, wherein the sealing element is selected from a group consisting essentially of an O-ring, a gasket, a washer, a seal, and a radial seal.

21. An apparatus, as recited in claim 19, wherein the frusto-conical sealing face of the female primary sealing structure comprises an angle of approximately 60°.

22. An apparatus, as recited in claim 19, wherein the female connector is used for connecting at least one element selected from a group consisting essentially of a hydraulic system, a pneumatic system, a flexible hose, a pipe, and a rigid tube.

23. An apparatus, as recited in claim 19,
wherein the female connector aft portion comprises threads selected from a group consisting essentially of a parallel thread, a tapered thread, a pipe thread, a male national pipe thread, a British standard parallel thread, a JIC 37-degree thread, an SAE 37-degree thread, a Type "M" 58-degree thread, a metric swivel fitting thread, a high-pressure hose thread, an industry-available connection system thread, and a high-pressure tubing thread.

24. An apparatus, as recited in claim 19, wherein the female connector further comprises a weep hole disposed forward of the female secondary sealing structure for facilitating indication of at least one condition selected from a group consisting essentially of an over-pressurized state and a leaking state.

25. An apparatus, as recited in claim 19, wherein the female connector includes a shoulder portion between the female primary sealing structure and the female secondary sealing structure.

* * * * *